United States Patent
Amirparviz

(10) Patent No.: US 9,329,388 B1
(45) Date of Patent: May 3, 2016

(54) HEADS-UP DISPLAY FOR A LARGE TRANSPARENT SUBSTRATE

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 618 days.

(21) Appl. No.: 13/345,105

(22) Filed: Jan. 6, 2012

Related U.S. Application Data

(60) Provisional application No. 61/480,130, filed on Apr. 28, 2011.

(51) Int. Cl.
*G02B 27/01* (2006.01)
*G02B 27/42* (2006.01)

(52) U.S. Cl.
CPC ........ *G02B 27/0101* (2013.01); *G02B 27/4233* (2013.01)

(58) Field of Classification Search
CPC .. G02B 27/01; G02B 27/0101; G02B 27/017; G02B 27/0172; G02B 23/125
USPC ............ 359/13, 558, 566–576, 630, 631, 633
See application file for complete search history.

(56) References Cited

U.S. PATENT DOCUMENTS

| | | | |
|---|---|---|---|
| 4,900,133 A | 2/1990 | Berman | |
| 5,093,567 A | 3/1992 | Staveley | |
| 5,539,422 A | 7/1996 | Heacock et al. | |
| 5,696,521 A | 12/1997 | Robinson et al. | |
| 5,715,337 A | 2/1998 | Spitzer et al. | |
| 5,748,377 A | 5/1998 | Matsumoto et al. | |
| 5,771,124 A | 6/1998 | Kintz et al. | |
| 5,815,126 A | 9/1998 | Fan et al. | |
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |

(Continued)

FOREIGN PATENT DOCUMENTS

| | | |
|---|---|---|
| GB | 2272980 A | 6/1994 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Kimberly N Kakalec
(74) *Attorney, Agent, or Firm* — Blakely Sokoloff Taylor & Zafman LLP

(57) ABSTRACT

A heads-up display includes a display region disposed in or on a substantially transparent substrate. The display region includes an array of reflective scattering elements and interstitial regions disposed between adjacent ones of the reflective scattering elements. The interstitial regions are substantially transparent to pass external light through the substrate. A light source is positioned to direct light onto the display region of the substrate such that an image generated by the light directed onto the display region is visible.

8 Claims, 5 Drawing Sheets

(56) References Cited

U.S. PATENT DOCUMENTS

| | | |
|---|---|---|
| 6,204,974 B1 | 3/2001 | Spitzer |
| 6,222,677 B1 | 4/2001 | Budd et al. |
| 6,236,511 B1 * | 5/2001 | Brown .................. 359/634 |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,203,005 B2 | 4/2007 | Jiang et al. |
| 7,242,527 B2 | 7/2007 | Spitzer et al. |
| 7,391,573 B2 | 6/2008 | Amitai |
| 7,436,560 B2 | 10/2008 | Chen et al. |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 8,189,263 B1 * | 5/2012 | Wang et al. .................. 359/633 |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2009/0141501 A1 * | 6/2009 | Mukawa .................. 362/296.1 |
| 2009/0160736 A1 | 6/2009 | Shikita |
| 2009/0201589 A1 * | 8/2009 | Freeman .................. 359/630 |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0253593 A1 | 10/2010 | Seder et al. |
| 2010/0278480 A1 | 11/2010 | Vasylyev |
| 2011/0213664 A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

HEADS-UP DISPLAY FOR A LARGE TRANSPARENT SUBSTRATE

CROSS-REFERENCE TO RELATED APPLICATION

This application claims the benefit of U.S. Provisional Application No. 61/480,130 filed on Apr. 28, 2011, the contents of which are incorporated herein by reference.

TECHNICAL FIELD

This disclosure relates generally to heads-up displays, and in particular but not exclusively, relates to a heads-up display for use in vehicular environments.

BACKGROUND INFORMATION

Heads-up displays ("HUDs") are useful in a variety of different environments. These displays are typically transparent displays that present information to a user without requiring the user to look away from a given perspective of interest. In general, they permit the user to be presented with data while looking forward with their head up as opposed to down at a screen or monitor.

HUDs can be a safety feature in an automotive environment, since drivers can receive visual information without taking their gaze from the road. A HUD that places the information directly in front of the driver in a see-through fashion allows the driver to always keep their view on the road in front of them. This mode of display permits superposition of computer generated images over outside scenes.

SUMMARY

Implementations of techniques, apparatuses, and systems are provided for a heads-up-display. In one aspect, the heads-up-display includes a display region disposed in or on a substantially transparent substrate. The display region includes an array of reflective scattering elements and interstitial regions disposed between adjacent ones of the reflective scattering elements. The interstitial regions are substantially transparent to pass external light through the substrate. A light source is positioned to direct light onto the display region of the substrate such that an image generated by the light directed onto the display region is visible.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of apparatuses, systems, and techniques for implementing a heads-up display on a large transparent substrate, such as a vehicle windshield, are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
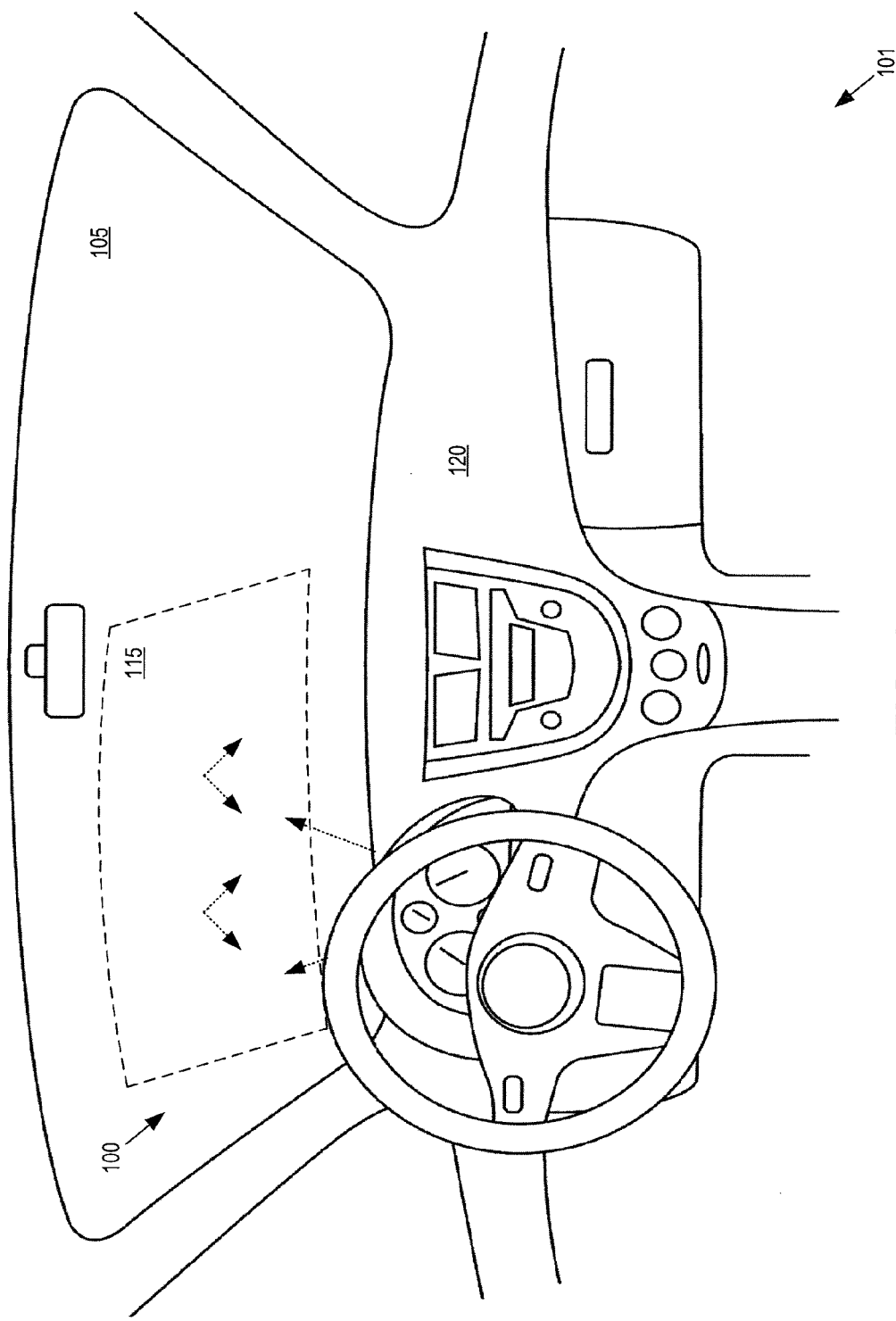
FIG. 1 illustrates a front view of a heads-up display projected onto a windshield of an automobile, in accordance with an embodiment of the invention.
Figure 2:
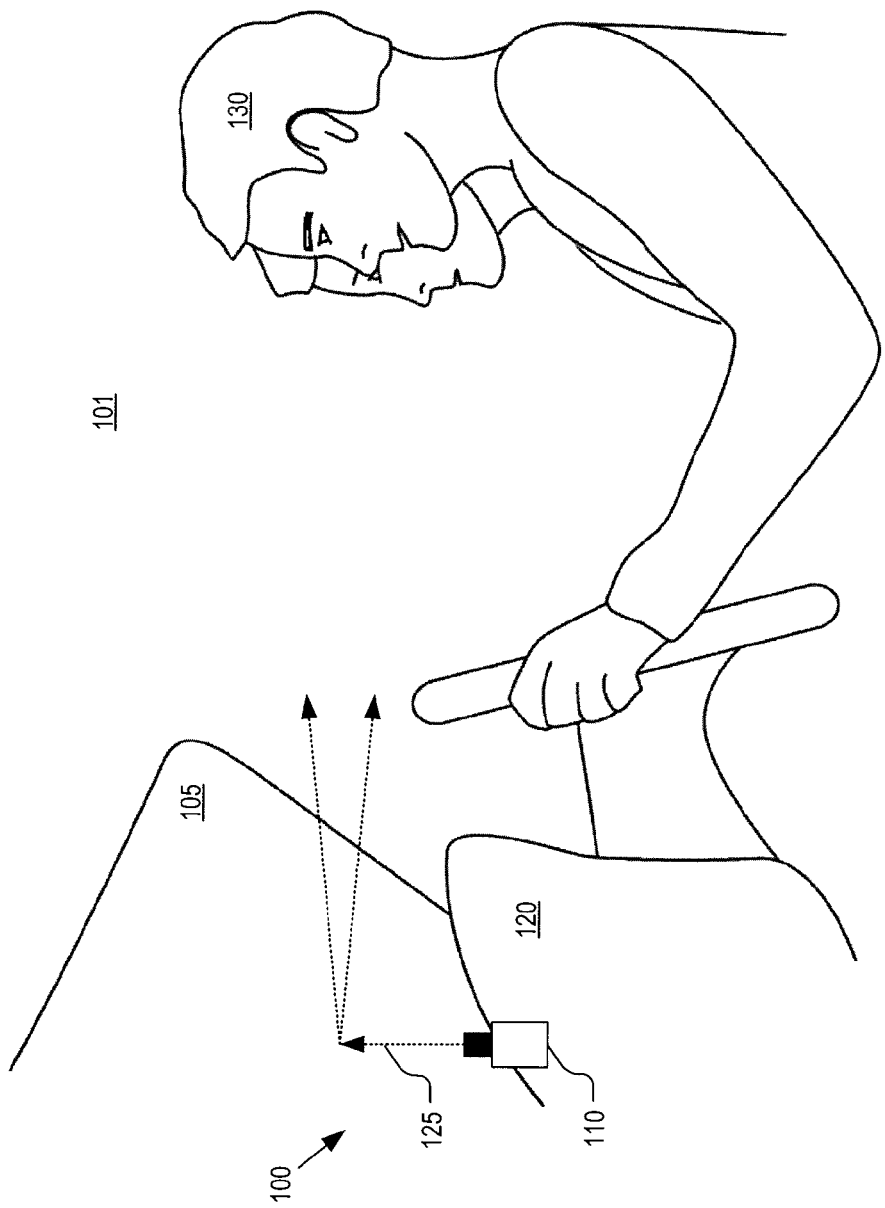
FIG. 2 illustrates a side view of a heads-up display projected onto a windshield of an automobile, in accordance with an embodiment of the invention.

FIGS. 1 and 2 illustrate a heads-up display ("HUD") system 100 for displaying images on a windshield 105 of a vehicle 101, in accordance with an embodiment of the invention. The illustrated embodiment of HUD system 100 includes a light source 110 and one or more display regions 115 on windshield 105. Light is generated at light source 110 disposed within dashboard 120 and projected onto display region 115 where it is reflected back towards driver 130. Display region 115 includes an array of reflective scattering elements disposed in or on windshield 105 to reflect the light with relatively large divergence or scattering angles. In some embodiments, the scattering angles are sufficiently large that light projected onto windshield 105 immediately in front of driver 130 can even be viewed by a front seat passenger.

In one embodiment, light 125 output from light source 110 is an image focused onto the surface of windshield 105 and which is reflected back towards the driver and/or passengers by display region 115. In this embodiment, the reflective scattering elements within display region 115 redirects or reflects the projected image back into the automobile while also scattering the reflected image to provide wide viewing angles for the images. In another embodiment, light source 110 outputs wavelength specific, coherent light 125 (e.g., laser light) that is projected onto the reflective scattering elements, which are arranged in a non-periodic array to form a reflective diffraction grid in or on windshield 105. Different diffraction grids can be disposed within different display regions of windshield 105 with each diffraction grid configured to generate a different fixed image when lit up by light 125 emitted from light source 110.

Display region 115 is a partially transparent region that permits external light to pass through to driver 130. Display region 115 facilities painting the images (both computer generated images ("CGI") or fixed images) over the real-world view out of windshield 105. In this manner, HUD system 100 can be used to provide an augmented reality to the driver or simply paint useful information (e.g., speed, fuel, engine RPMs, navigation directions, etc.) onto windshield 105 within the driver's heads-up view.

Although HUD system 100 is illustrated in FIGS. 1 and 2 in the context of an automobile, it should be appreciated that HUD system 100 is adaptable for use with a variety of different vehicles including automobiles, planes, boats, motorcycles, etc. Furthermore, HUD system 100 may be generically applicable for use on large transparent substrates, such as windows or glass doors in a building or otherwise.

Figure 3:
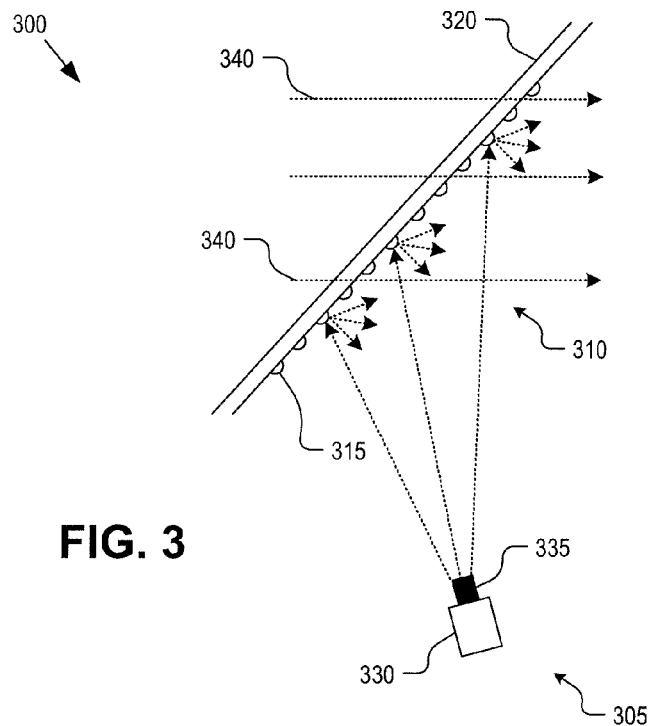
FIG. 3 illustrates a cross-sectional view of a heads-up display system that uses a reflective scattering surface disposed in or on a transparent substrate to provide a wide field of view, in accordance with an embodiment of the invention.

FIG. 3 illustrates a cross-sectional view of a HUD system 300, in accordance with an embodiment of the invention. HUD system 300 is one possible implementation of HUD system 100 illustrated in FIGS. 1 and 2. The illustrated embodiment of HUD system 100 includes a light source 305 and an array 310 of reflective scattering elements 315 disposed on a transparent substrate 320. In one embodiment, transparent substrate 320 may be a windshield of a vehicle. Although FIG. 3 illustrates array 310 as being disposed on the inside surface of transparent substrate 320, in other embodiments, array 310 may be disposed on an internal layer of transparent substrate 320, which is covered over by another planarized transparent layer.

In the illustrated embodiment, light source 305 includes an image generator 330 and an optical module 335. Image generator 330 outputs a CGI image for reflection off array 310. Image generator 330 may be implemented using a variety of image generating devices, such as an RGB laser source, an LED source, an organic LED source, a liquid crystal on silicon ("LCoS") projector, or otherwise. Optical module 335 may include one or more lens elements to spread the light over the region of array 310 and to focus the light onto the surface of transparent substrate 320. Array 310 is made up of a pattern of reflective scattering elements 315. In one embodiment, reflective scattering elements 315 each including a substantially flat side facing outside of transparent substrate 320 and a curved reflective surface facing inside of transparent substrate 320. For example, the curved reflective surface may have a substantially semi-spherical or hemispherical shape. The reflective surface itself may be fabricated using a non-optically transmissive reflective layer (e.g., metallic coating). In the metallic embodiment, array 310 may be fabricated by depositing a metal layer on transparent substrate 320, patterning the metal layer, and then reflowing the patterned metal to permit surface tension to create the curved reflective surfaces. In another embodiment, the curved reflective surface is a wavelength selective coating that is substantially reflective to a wavelength of the light emitted from light source 305, while being substantially transmissive to other visible wavelengths. This wavelength selective reflective surface may be fabricated using a multi-layer coating, such as a dichroic coating. In the wavelength selective coating embodiment, a clear polymer material may be used to create the three-dimensional shape or raised bump structure of each reflective scattering element 315 and the raised bump structures are subsequently coated with the dichroic coating.

Array 310 is a partially transparent region that permits external light 340 to pass through transparent substrate 320 even though reflective scattering elements 315 themselves may be coated with a non-optically transmissive reflective material. External light 340 passes through interstitial regions disposed between the reflective scattering elements 315. The size of each reflective scattering element 315 and the interstitial regions may be selected to achieve the appropriate level of transparency for array 310. In some embodiments, the individual reflective scattering elements 315 may be sufficiently small so as to be imperceptible or nearly imperceptible to driver 130 or other occupant of automobile 101.

Figure 4:
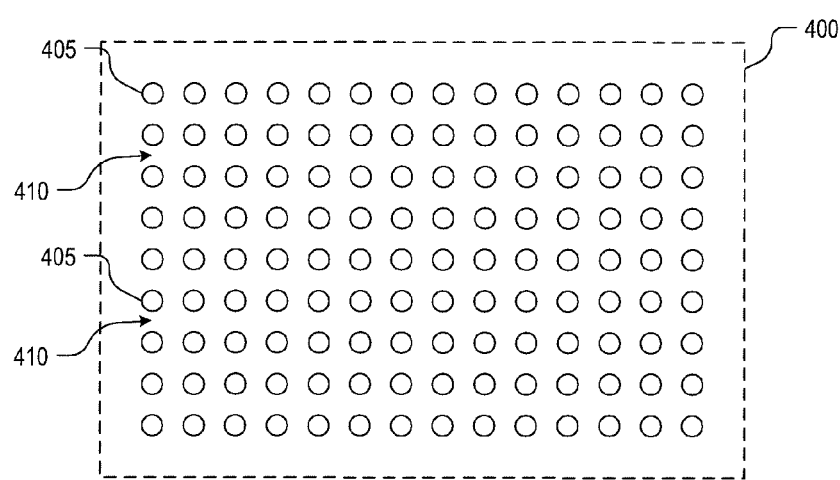
FIG. 4 illustrates a reflective scattering surface that has a uniform periodic spacing between reflective scattering elements, in accordance with an embodiment of the invention.

FIG. 4 illustrates a reflective scattering surface 400 including reflective scattering elements 405, in accordance with an embodiment of the invention. Reflective scattering surface 400 is one possible implementation of array 310 (see FIG. 3) or display region 115 (see FIG. 1). The illustrated embodiment of reflective scattering surface 400 includes a regular or uniform periodic spacing between reflective scattering elements 405 to reflect an image output from light source 305 back towards the same side of transparent substrate 320 from which the light is projected. This permits the viewer (e.g., driver 130) and light source 305 to be positioned on the same side of transparent substrate 320. Due to the curvature of the reflective surface of each reflective scattering element 405, the light is reflected with a relative high angle of divergence so that it can be perceived from a wide angle of positions. Each reflective scattering element 405 can be thought of as reflecting a single pixel of the image painted onto transparent substrate 320. Furthermore, the interstitial regions 410 between each reflective scattering element 405 permits external light 340 to pass through so that the pixilated reflected image is perceived as being painted over the external scene. For example, each reflective scattering element 405 may have a diameter of approximately 200 µm and be offset from an adjacent element by an interstitial gap 410 of approximately 200 µm. Of course, other dimensions may be used. Although FIG. 4 illustrates reflective scattering surface 400 as having a uniform periodic spacing, other embodiments may use a non-regular spacing or a randomized spacing.

Figure 5:
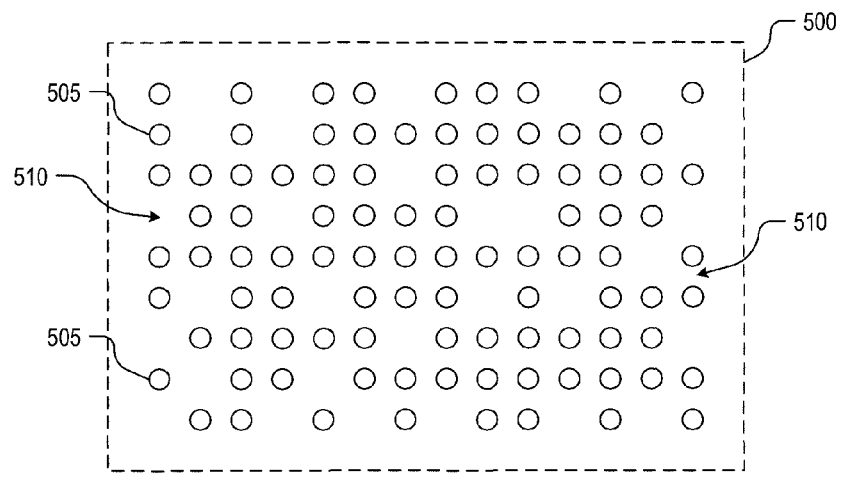
FIG. 5 illustrates a reflective scattering surface that has a non-uniform spacing to form a reflective diffraction grid, in accordance with an embodiment of the invention.

FIG. 5 illustrates a reflective scattering surface 500 having non-uniform spacing between reflective scattering elements 505 to form a reflective diffraction grid, in accordance with an embodiment of the invention. Reflective scattering surface 500 is one possible implementation of array 310 (see FIG. 3) or display region 115 (see FIG. 1). However, instead of illuminating reflective scattering surface 500 with an image, reflective scattering surface 500 is illuminated with uniform laser light having a fixed wavelength. The size of elements 505 and/or the size of the interstitial spacing 510 between elements 505 may be selected to be on the same order of magnitude as the wavelength of the laser light, which results in diffraction. The non-uniform pattern or diffraction grid can be specified such that the diffraction grid will reflect a fixed image in response to uniform illumination by laser light. Diffraction grid patterns using reflective scattering elements 505 can be designed to generate nearly any image in response to illumination by laser light. To fabricate a diffraction grid using reflective scattering elements 505, the size of either or both of elements 505 and interstitial spacing 510 will have variable non-uniform size across reflective scattering surface 500.

Figure 6:
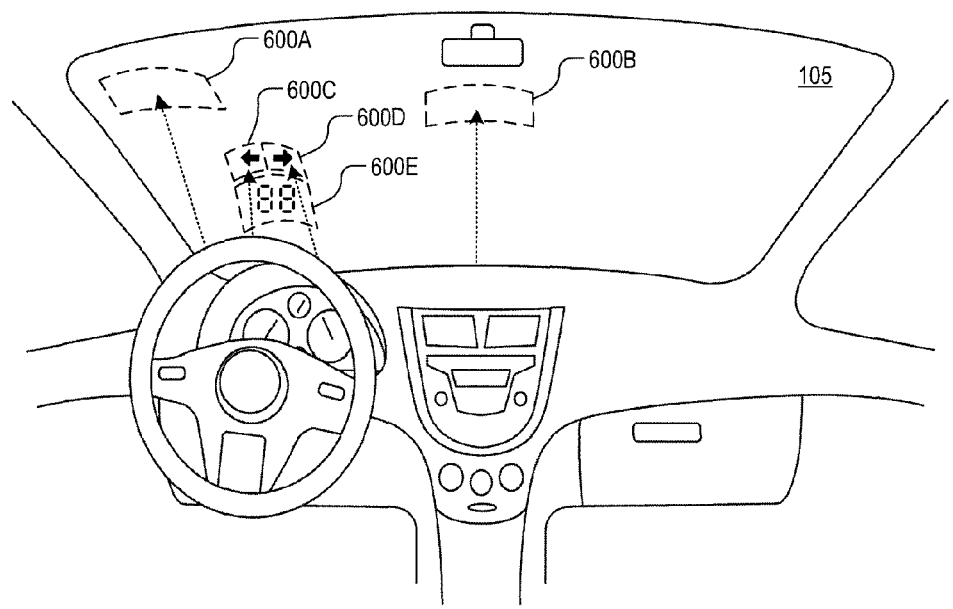
FIG. 6 illustrates how a plurality of display regions positioned at different locations on a windshield to display various information, in accordance with an embodiment of the invention.

FIG. 6 illustrates how a plurality of display regions can be positioned at different locations on windshield 105 to display various information, in accordance with an embodiment of the invention. As illustrated, windshield 105 may include multiple display regions 600A-E (collectively display regions 600) positioned anywhere on windshield 105. Each display region 600 represent one possible implementation of display region 115 illustrated in FIG. 1. Furthermore, display regions 600 may be implemented using reflective scattering surfaces 400 or 500. In one embodiment, windshield 105 may include a mix of reflective scattering surfaces 400 and 500. The various display regions 600 may be illuminated with a single light source 110 where optical splitters and various types of light guides or reflectors are used to selectively direct the light output from a single light source to the various display regions 600. Alternatively, each display region 600 may be illuminated by its own associated light source 115. The various display regions 600 may be used to display vehicle/navigation information such as speed, engine RPM, fuel, music information, navigation prompts, compass information, caller ID, etc. For example, navigation prompts may include first and second diffraction grids that display left and right pointing arrows, respectively (e.g., display regions 600C and 600D), when illuminated. These arrows may be illuminated in response to a navigation system to provide turning cues to driver 130. If reflective scattering surface 400 is used, then the illumination light may include an image (e.g., a CGI) for reflection towards the driver and/or passenger(s). If reflective scattering surface 500 is used, then the illumination light may be regular laser light. In yet another embodiment, the array of reflective scattering elements may organize the individual reflective scattering elements such that the overall shape of the array assumes the shape of the given image. In some embodiments, multi-colored laser light may be used to generate multi-colored images.

Figure 7:
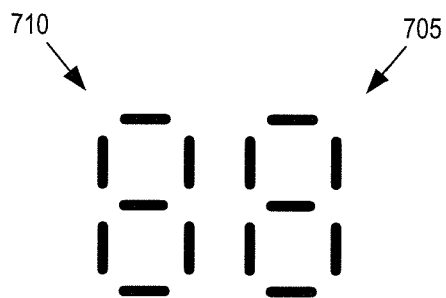
FIG. 7 illustrates an example image that can be illuminated within one or more display regions on a windshield, in accordance with an embodiment of the invention.

FIG. 7 illustrates an example image that can be illuminated within one or more display regions on a windshield, in accordance with an embodiment of the invention. FIG. 7 illustrates two digital number displays 705 and 710. Each digital number display is made up of three horizontal bars and four vertical bars. In one embodiment, each horizontal or vertical bar may represent an independent display region within windshield 105 having its own array of reflective scattering elements. In other words, each horizontal or vertical bar may include its own reflective scattering surface 400 or 500. When a given bar is not illuminated, it is virtually imperceptible to the driver and passenger(s); however, a given bar will appear to the driver and/or passenger(s) upon illumination of its associate array of reflective scattering elements. In this manner, variable alpha-numeric information can be painted onto windshield 105 in a dynamic manner.

Figure 8:
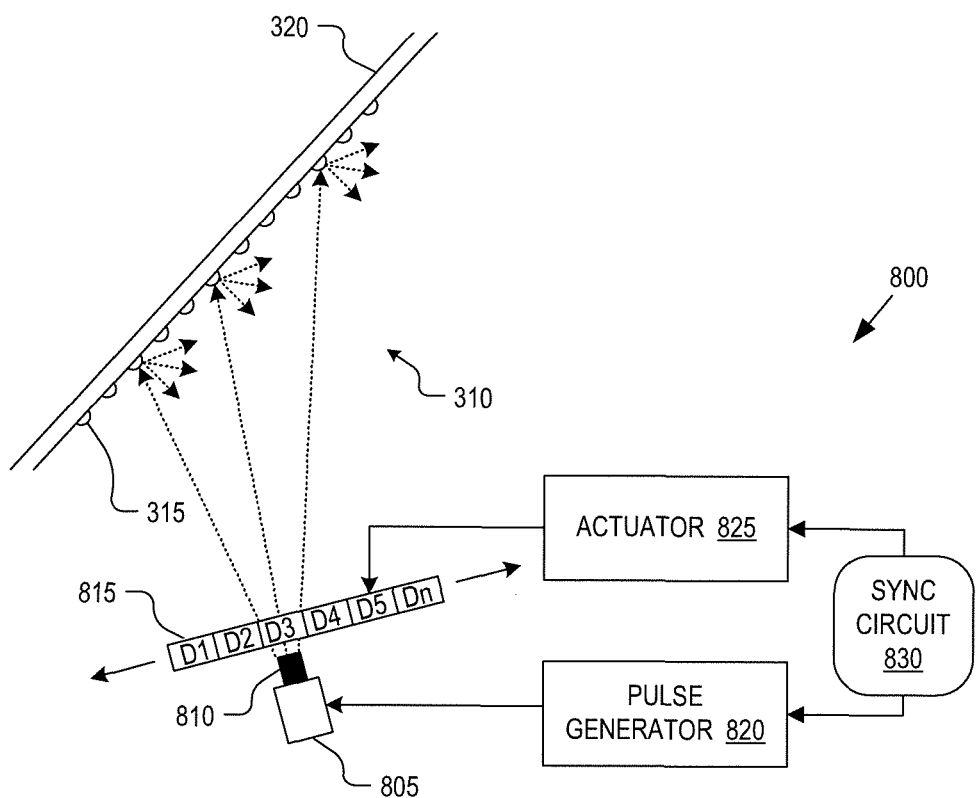
FIG. 8 is a functional block diagram of a heads-up display system that includes a diffraction grid having multiple independent diffraction gratings positioned between a laser source and a display region on a transparent substrate, in accordance with an embodiment of the invention.

FIG. 8 is a functional block diagram of a light source 800 for use with array 310 of reflective scattering elements 315 disposed on a transparent substrate 320, in accordance with an embodiment of the invention. Light source 800 represents one possible implementation of light source 110 in FIG. 2 or light source 305 in FIG. 3. The illustrated embodiment of light source 800 includes a laser source 805, optics 810, a diffraction element 815, a pulse generator 820, an actuator 825, and a synchronization circuit 830.

Diffraction element 815 is a substrate that includes a plurality of individual diffraction gratings (e.g., diffraction gratings D1, D2, D3, D4, D5 . . . Dn) physically present on the substrate. Each diffraction grating is configured to generate a different image when laser light output from laser source 805 passes through it. Thus, diffraction gratings D1-Dn represent optically transmissive diffraction gratings in contrast to a reflective diffraction grid, such as array 310. Optics 810 may include an expansion lens to expand a cross-section of the laser light to cover an entire individual diffraction grating at a time. When the laser light passes through a given diffraction grating, an image is projected onto the surface of transparent substrate 320 where array 310 is positioned. Array 310 of reflective scattering elements 315 then reflects and scatters the diffraction image towards the viewer(s) (e.g., driver 130 and/or the passenger). However, in this embodiment the individual sizes of reflective scattering elements 315 and their interstitial regions are sufficiently large so as not to cause diffraction rather than scattered reflection.

Actuator 825 is mechanically coupled to diffraction element 815 to physically move diffraction element 815 to select a given diffraction grating. Diffraction element 815 may assume a variety of shapes such as a disc with the diffraction gratings positioned radially around the disc, a plate with the diffraction gratings aligned in a linear one-dimensional array, a plate with the diffraction gratings aligned in two-dimensional array, or otherwise. Thus, actuator 825 may be implemented in a variety of different manners based upon the geometry of how diffraction element 815 organizes the diffraction gratings. For example, actuator 825 may rotate diffraction element 815 or translate diffraction element 815 in one or two dimensions. Actuator 825 may be implemented using various different devices, such as a servomechanism, a microelectromechanical system (MEMS) device, a voltage controlled actuator, a magnetically controlled actuator, or otherwise.

Since diffraction element 815 uses physical re-alignment to select a different diffraction grating to generate a different image, such physical re-alignment requires a finite amount of time. Thus, in the illustrated embodiment, synchronization circuit 830 is coupled to actuator 825 and pulse generator 820 to synchronize the re-alignments with laser pulsation. Laser source 805 may be pulse at a fixed rate with the inter-pulse durations used for re-alignment. Thus, when laser source 805 is turned off, actuator 825 may reposition diffraction element 815 and when the laser source 805 is turned on, realignment position should already be achieved. If the image is to remain static using the same diffraction grating, then laser source 805 may be repeatedly pulsed through the selected diffraction grating. In one embodiment, when displaying a static image, the pulsation rate may be increased to provide better image quality (reduced flicker) and decreased when realignment is necessary. In other embodiments, a fixed pulsation rate may be used.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for implementing a heads-up display, the apparatus comprising:
    a substrate that is substantially transparent;
    a diffraction grid of reflective scattering elements disposed along a surface of the substrate; and
    interstitial regions disposed between adjacent ones of the reflective scattering elements of the diffraction grid, the interstitial regions being substantially transparent to pass external light from a first side of the substrate through to a second side of the substrate, wherein the diffraction grid of reflective scattering elements diffracts a heads-up display image to the second side of the substrate in response to laser light directed onto the diffraction grid from the second side of the substrate and wherein the heads-up display image is superimposed over an external scene originating from the first side of the substrate, wherein the diffraction grid of reflective scattering elements is a non-uniform pattern of the reflective scattering elements that generates a fixed image via diffraction in response to uniform illumination by the laser light, wherein optical paths through the apparatus for the external light incident from the first side of the substrate are more transparent when incident through the interstitial regions than when incident through the reflective scattering elements.

2. The apparatus of claim 1, further comprising a laser source to generate the laser light and positioned on the second side of the substrate and aligned to direct the laser light onto the diffraction grid of reflective scattering elements.

3. The apparatus of claim 1, wherein each of the reflective scattering elements includes:
   a substantially flat side facing the first side of the substrate; and
   a curved reflective surface facing the second side of the substrate, wherein the curved reflective surface scatters reflected light.

4. The apparatus of claim 3, wherein the curved reflective surface of each of the reflective scattering elements comprises a semi-spherical reflective surface.

5. The apparatus of claim 3, wherein the curved reflective surface of each of the reflective scattering elements comprises a metallic layer that is non-optically transmissive and blocks the external light that is incident upon the reflective scattering elements from passing through the reflective scattering elements.

6. The apparatus of claim 3, wherein the curved reflective surface of each of the reflective scattering elements comprises a wavelength selective coating that is substantially reflective to a wavelength of the laser light generated by the laser source and substantially transmissive to other visible wavelengths.

7. The apparatus of claim 1, further comprising:
   a plurality of diffraction grids disposed in or on the substrate in different locations, each of the diffraction grids including a different diffraction pattern to generate a different image superimposed over the external scene when lit up by laser light; and
   a plurality of laser sources each aligned to selectively illuminate a corresponding one of the diffraction patterns to generate the corresponding different image.

8. The apparatus of claim 1, wherein the interstitial regions comprise gaps along the surface of the substantially transparent substrate upon which the reflective scattering elements are disposed and wherein the gaps along the surface of the substrate distinctly separate adjacent ones of the reflective scattering elements from each other.

\* \* \* \* \*